United States Patent [19]
Smith et al.

[11] Patent Number: 5,657,430
[45] Date of Patent: Aug. 12, 1997

[54] SOFTWARE-BASED PROCEDURE FOR CONVERSION OF A SCALABLE FONT CHARACTER BITMAP TO A GRAY LEVEL BITMAP

[75] Inventors: Marcus A. Smith; Brian E. Hoffmann; Jeffrey L. Trask, all of Boise, Id.

[73] Assignee: Hewlett-Packard Company, Palo Alto, Calif.

[21] Appl. No.: 612,037

[22] Filed: Mar. 7, 1996

[51] Int. Cl.$^6$ .................................................. C06K 15/00
[52] U.S. Cl. .................................................. 395/102; 395/109
[58] Field of Search ........................................ 395/102, 109, 395/110, 112, 128, 139, 167, 170, 172; 345/26, 129, 130, 147, 148; 382/270, 271, 272, 274, 298, 299–301

[56] References Cited

U.S. PATENT DOCUMENTS

| | | |
|---|---|---|
| 3,573,789 | 4/1971 | Sharp et al. . |
| 4,032,977 | 6/1977 | Liao . |
| 4,143,401 | 3/1979 | Coviello . |
| 4,150,400 | 4/1979 | Wong . |
| 4,323,974 | 4/1982 | Sekigawa . |
| 4,355,337 | 10/1982 | Sekigawa . |
| 4,437,122 | 3/1984 | Walsh et al. . |
| 4,450,483 | 5/1984 | Coviello . |
| 4,528,561 | 7/1985 | Kitamura . |
| 4,847,641 | 7/1989 | Tung . |
| 4,851,825 | 7/1989 | Naiman ................ 395/109 |
| 5,005,139 | 4/1991 | Tung . |
| 5,237,646 | 8/1993 | Bunce . |
| 5,329,599 | 7/1994 | Curry et al. ................ 382/54 |
| 5,506,941 | 4/1996 | Kuramida ................ 395/110 |

*Primary Examiner*—Arthur G. Evans

[57] ABSTRACT

A binary pixel bitmap image is converted to a multi-bit gray level pixel image at a level of resolution that is reproducible by a laser printer. An edge smoothing procedure is employed by the laser printer and comprises the steps of: deriving from font contours of the image, a binary pixel bitmap of the image at a higher level of resolution than is output by the laser printer; logically stepping an m×n pixel window across pixel groups of the higher resolution binary pixel bitmap and, at each step, determining a count of pixels of one binary kind that are present within the pixel window; converting each count of pixels to a corresponding modulation signal; and controlling a laser in the laser printer in accordance with each modulation signal so that an edge smoothed gray level image is produced at the printer's level of output resolution.

9 Claims, 2 Drawing Sheets

SOFTWARE-BASED PROCEDURE FOR CONVERSION OF A SCALABLE FONT CHARACTER BITMAP TO A GRAY LEVEL BITMAP

FIELD OF THE INVENTION

This invention relates to print image enhancement techniques and, more specifically, to a method for creating a gray level representation of a scalable font character.

BACKGROUND OF THE INVENTION

A gray level image comprises a multiplicity of pixels, each pixel represented by a digital value indicative of a gray level or a color value. Each gray level corresponds to a color tone between 0% and 100%. When such a gray level image is passed to a black/white binary laser printer, the gray level values are converted to binary pixel values. The laser printer then attempts to reproduce the gray levels of the image through use of dither procedures or other approximation methods.

The prior art binary laser printer has been succeeded by gray level laser printers which modulate a laser beam's intensity or duration to achieve a variation in charge state at each pixel location on a photoconductor which, when subsequently toned, produces a highly faithful gray level reproduction.

Edge definition is a problem in binary pixel images due to the stepped pixel arrangement employed to represent boundaries of characters and images. The prior art has employed a procedure, generally called "Resolution Enhancement technology" (REt), to smooth edges by modulating pixels in accordance with comparisons made to pre-stored template arrangements. U.S. Pat. Nos. 5,005,139 and 4,847,641, both to C. C. Tung and assigned to the same Assignee as this application, describe a hardware-based method for accomplishing such REt edge enhancement. The disclosure of the Tung patents is incorporated herein by reference. Briefly stated, the Tung procedure logically tiles "windows" over successive bit patterns of an image. Each image pixel window created by the tiling procedure comprises a center pixel and surrounding neighbor pixels. Each image pixel window is thus a pattern of pixels from the original binary image.

Each image pixel window is compared in parallel, in the Tung system, against hundreds of templates, each template defining an expected edge pixel arrangement which can be improved by modification of the central pixel in the image pixel window. Each template is associated with a correction pixel for the central pixel of the image pixel window.

The central pixel and neighbor pixels within the image pixel window are compared against the templates, in parallel, via a gate array so as to determine in one or very few clock cycles which template, if any, matches the pixel arrangement within the image pixel window. If a template is found to match the image pixel window pattern, the associated correction pixel value is output and is substituted for the central pixel in the image pixel window.

Thus, as the image pixel window is stepped across the image, corrections are made to any pixel arrangement therein which matches a template so as to improve edge presentation of the binary image. REt has proved successful in improving print quality of binary pixel value images.

Presently, two types of fonts are widely used in laser printers, i.e., bitmapped and scalable. A scalable font includes characters that are defined as a series of contours (i.e., functions) so that when provided with a desired point size, produce a precise character of the desired shape and point size. Bitmapped fonts differ from a scalable font in that they cannot be changed in point size.

Laser printers that utilize gray level pixel values may employ four, six or eight bits to define each pixel's gray value. It is desirable to improve the smoothness of a gray level scalable font by adjusting the gray levels of edge pixels of each font character. The prior art has, as a result, employed software, firmware and hardware-implemented edge smoothing in gray level laser printers.

Frasier et ah, in U.S. Pat. Nos. 5,134,495 and 5,193,008, employ an edge smoothing technique which changes laser pulse exposure times in accordance with template comparisons, to selected pixels in an image. Their process initially creates a binary image at a level of resolution (e.g., 600 dots per inch (dpi)) that is higher (e.g., double) than that which a printer can output. A logical window is then stepped, at 600 dpi, across the entire image plane. At each step of the window, the higher resolution pixel arrangement is compared to pre-existing templates and, upon a match, causes an altered modulation of the printer's laser beam. The modulated laser beam produces on a photoreceptor not only a gray level central pixel at the lower resolution, but also sufficiently exposes the photoreceptor about the edges of a central pixel to enable scans by adjacent scan lines to combine to create intermediate pixels between the scan lines which provides an edge smoothing effect.

More specifically, pixel dots are created half-way between adjacent horizontal scan lines by energizing a plurality of pixels on adjacent scan lines so that the sum of the energies applied to intermediate pixel points is above a threshold level—thereby enabling the intermediate pixel points to be later toned. Frasier et ah employ a "look up table" based upon a template view of the source bitmap.

In the '008 patent, Frasier et al. operate in a similar manner to that described in the '495 patent, but utilize a 1×3 pixel window which enables a much simplified logic to be utilized to control the decision making process regarding pulse width modulation of the printer's laser.

Both of the Frasier et al. patents teach that the entire image plane is created at a higher level of resolution, thereby requiring a substantial memory allocation. Further, to carry out the edge-smoothing procedure taught in the '495 patent, many templates must be provided (in the form of a look-up table) to enable window comparisons to be made and pulse width modulations to be derived. The edge-smoothing procedure described in the '008 patent does not enable the obtaining of all possible combinations of interleaved pixels, but requires less logic to obtain intermediate pixel representations and a resultant edge-smoothing action.

It is an object of this invention to provide an improved software-based edge-smoothing procedure for a gray level laser printer.

It is another object of this invention to provide an improved edge-smoothing procedure wherein required memory capacity is minimized.

SUMMARY OF THE INVENTION

A binary pixel bitmap image is converted to a multi-bit gray level pixel image at a level of resolution that is reproducible by a laser printer. An edge smoothing procedure is employed by the laser printer and comprises the steps of: deriving from font contours of the image, a binary pixel bitmap of the image at a higher level of resolution than is output by the laser printer; logically stepping an m×n pixel window across pixel groups of the higher resolution binary pixel bitmap and, at each step, determining a count of pixels of one binary kind that are present within the pixel window; converting each count of pixels to a corresponding modulation signal; and controlling a laser in the laser printer in accordance with each modulation signal so that an edge smoothed gray level image is produced at the printer's level of output resolution.

DETAILED DESCRIPTION OF THE INVENTION

Multi-color laser printers employ scalable fonts to derive alphanumeric characters for printing on a media sheet. Such characters exhibit aliasing effects (i.e., staircase-like edges on sloped lines) unless efforts are made to edge smooth the character representations. Since a color laser printer wherein the invention to be described below is incorporated does not include hardware for edge smoothing, an anti-aliasing software/firmware procedure is employed to derive smooth character representations which are then buffered for later use during print actions.

Since only individual bitmap font characters are edge smoothed and then buffered, the amount of memory required is minimized—as contrasted to prior art anti-aliasing procedures which apply the edge smoothing function across an entire image plane. Further, once the procedure is complete, the edge-smoothed characters are available for repetitive use without requiring a re-execution of the edge smoothing procedure. Further, the invention's simplified procedure for conversion of a high resolution bitmap of a character to a lower resolution bitmap eliminates the need for large numbers of templates and template comparisons.

Figure 1:
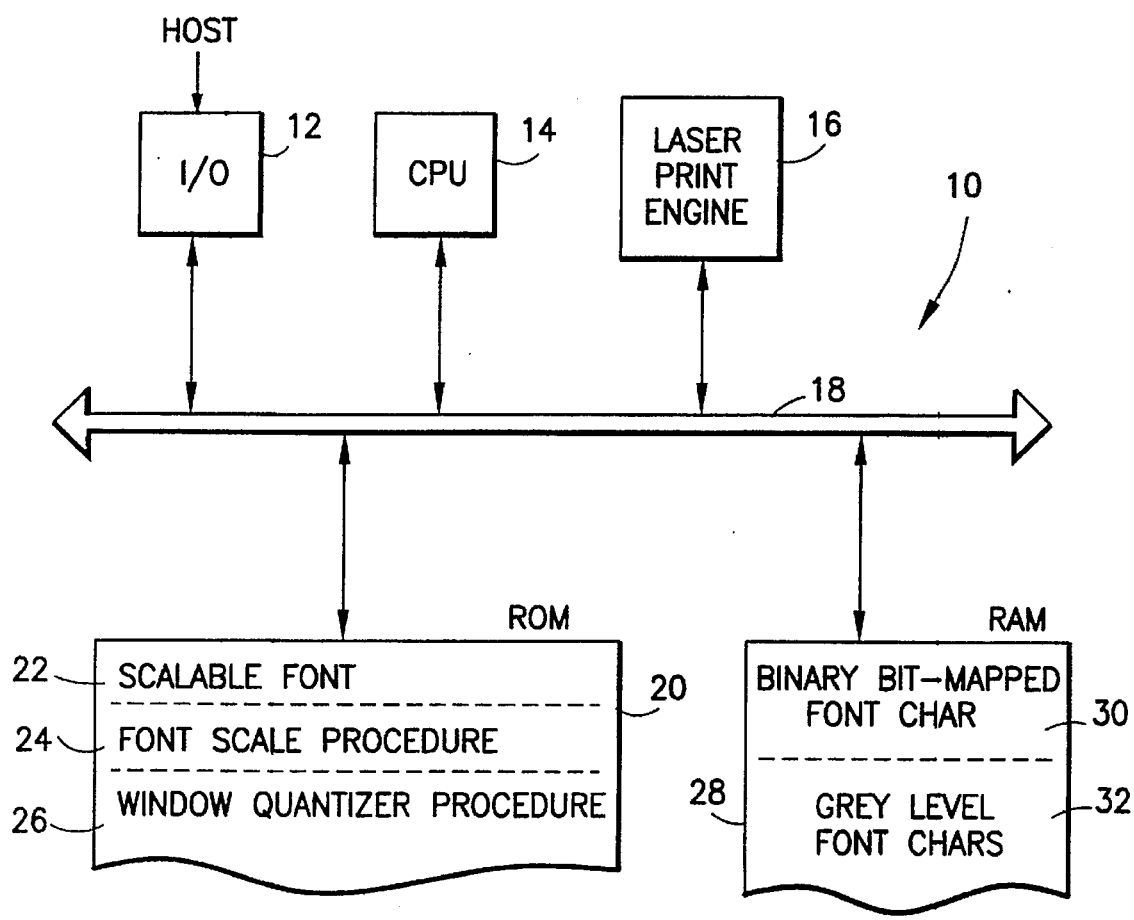
FIG. 1 is a high level block diagram of a system for performing the method of the invention.

Turning to FIG. 1, a high level block diagram illustrates a laser printer 10 for performing the method of the invention. Laser printer 10 includes an input/output (I/O) module 12 which receives data comprising a document or other image from a host processor and causes that data to be buffered. A central processing unit (CPU) 14 controls the overall operation of laser printer 10. A laser print engine 16 is connected to a bus 18 over which system communications occur. A read-only memory 20 includes a resident scalable font 22, a font scale procedure 24 and a window quantizer procedure 26.

As is known in the prior art, a scalable font is a plurality of character outlines that are defined by functions which, in turn, enable derivation of the contours of the outlines. An attribute of a scalable font is that, given a point size, a font scale procedure 24 can convert the font contour data into a bitmapped character at the required point size. Scalable font 22 and font scale procedure 24 are known in the prior art and are available from both laser printer manufacturers and font software/firmware providers.

Window quantizer procedure 26, which will be described in detail below, is controlled by CPU 14 and enables performance of the method of the invention to edge-smooth characters of a desired font. Before execution of window quantizer procedure 26, font scale procedure 24 outputs a binary bitmapped font character at a high resolution level which is, preferably, an integer multiple of the resolution level that laser print engine 16 outputs. Each high resolution level binary bitmapped font character is loaded into a random access memory (RAM) 28 in RAM area 30. Then, via a windowing procedure, each high resolution binary bitmapped font character is converted to a gray level font character at printer resolution and is stored in RAM area 32. Each gray level font character comprises plural pixels, each pixel represented by a multi-bit value which defines a gray level (or color intensity level).

Figure 2:
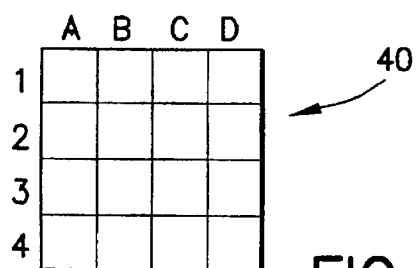
FIG. 2 is a schematic showing of a pixel window which is logically stepped across a high resolution binary bitmapped font character to achieve a quantization to a lower, printer-compatible resolution.

Turning to FIG. 2, window quantizer procedure 26 employs a logical pixel window 40 which, in the example to be described below, is a 4×4 pixel window. For ease of identification, the columns of pixel window 40 have been labeled A–D and the rows labeled 1–4. Hereafter, it will be assumed that laser print engine 16 produces a color image at a printer resolution level of 300 dpi. At such printer resolution level, font characters will exhibit alias effects. To provide edge-smoothed (anti-aliased) font characters, window quantizer procedure 26 is called.

Figure 3:
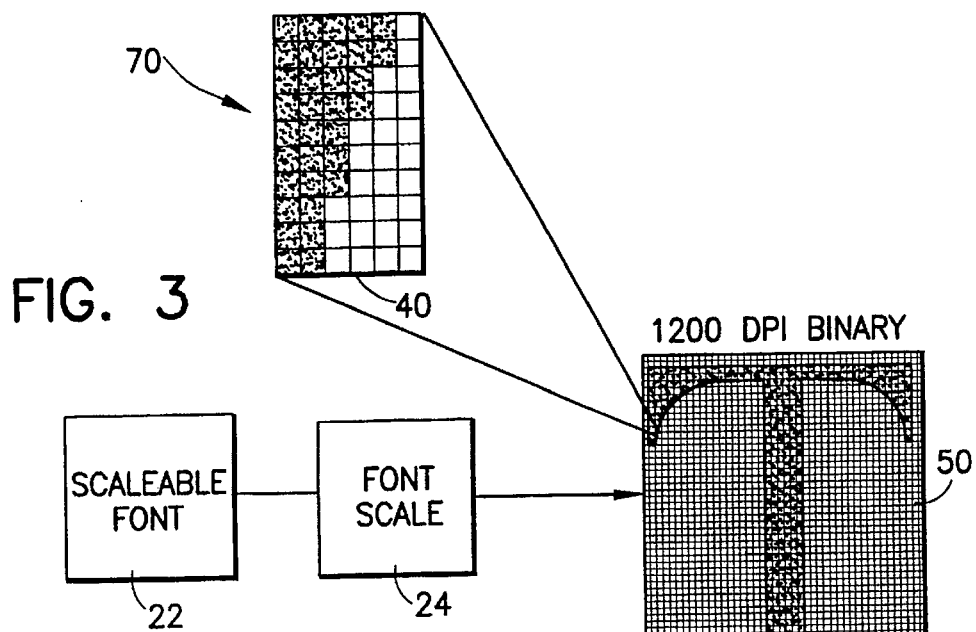
FIG. 3 is a schematic showing of data flow during the method of the invention.

As schematically shown in FIG. 3, font scale procedure 24 accesses a font character outline from scalable font 22. Font scale procedure 24 then outputs a binary bitmap of the character at a level of resolution that is substantially in excess of the print resolution output by laser print engine 16. In this instance, font scale procedure 24 outputs a binary bitmapped font character at a 1200 dpi.

In the example shown in FIG. 3, it is assumed that a T font character is called from scalable font 22 in response to the operation of font scale procedure 24. The resultant binary bitmapped "T" 50 at 1200 dpi is stored in RAM area 30 (FIG. 1). Thereafter, 4×4 window quantizer subroutine 52 is called by window quantizer procedure 26 and logically steps pixel window 40 across 1200 dpi binary bitmap font character 50.

To accomplish the window stepping action, window 40 is logically superimposed over the upper left corner (for instance) of 1200 dpi bitmap character 50 and is then stepped across the bitmap in steps of four pixels. At each step, window quantizer subroutine 52 counts the number, for instance, of black dots in image 50 that are encompassed by window 40. The number of black dots is then stored in a pixel sum register 54. Pixel sum register may be a separate register or a storage area within gray level font character area 32 of RAM 28.

Thus, at each step of window 40, a count of the number of black dots is derived, thereby quantizing the high level of resolution (e.g., 1200 dpi) down to the resolution level which is output by laser print engine 16 (e.g., 300 dpi).

After window 40 has been completely stepped across bitmap 50, it is incremented down by 4 rows and is again logically stepped across the 1200 dpi bitmapped image while repeating the above described quantization procedure, etc.. At the end of the procedure, the 1200 dpi binary bitmapped character has been converted to a 300 dpi pixel bitmap, with each pixel represented by a 4 bit gray level value that is a conversion from the black dot count at each window position.

Returning to FIG. 2 (and as illustrated by expanded area 70 in FIG. 3), the logical stepping of window 40 over a high resolution bitmapped pixel image will normally cause pixels to first appear at a corner or along one edge of window 40. Thus, as window 40 is stepped from position to position, at the higher indicated resolution of 1200 DPI, black image pixels tend to "migrate" into window 40 from one edge or another and/or from one corner or another. When, for instance, window 40 is stepped to a new position over the binary bitmap image as shown at 70 in FIG. 3, columns A and B of window 40 are completely filled with black image pixel dots and window position C-1 also is logically superimposed over a black image pixel. The window quantizing procedure 52 counts the number of pixels (i.e., 9) and stores that value in pixel sum register 54. Thereafter, each count value is converted to a corresponding multi-bit gray value and is stored.

Figure 4:
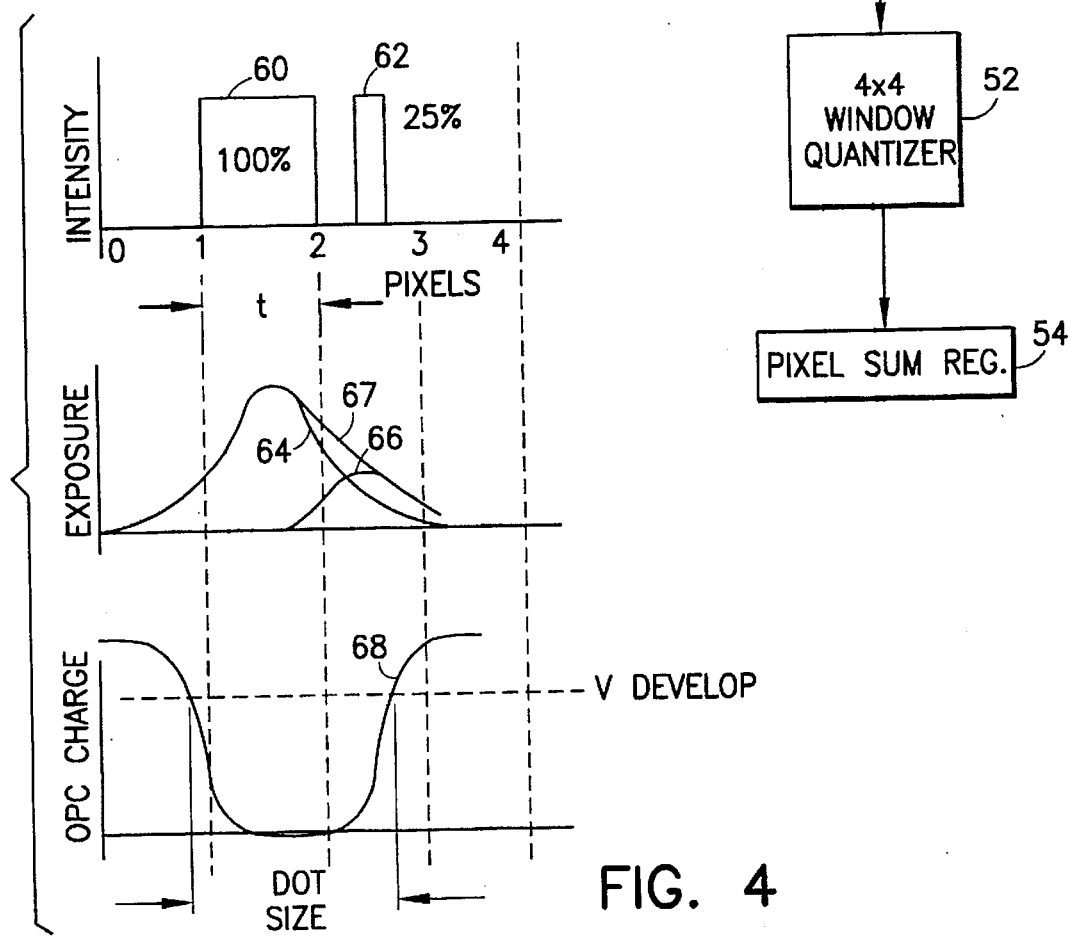
FIG. 4 illustrates plots of intensity, photoreceptor exposure level and dot size resulting from adjacent laser modulation signals.

When it is then desired to reproduce the gray level image, the multi-bit gray level values are accessed and each gray level value is employed to control a modulation pulse width applied to the laser in laser print engine 16. As more specifically shown in FIG. 4, if the laser is to apply a full black dot at a pixel location, the laser is modulated so as to provide an optical pulse 60 for the entire duration of a pixel time. Such a black dot results when window 40 (FIG. 2) is logically overlaid onto a portion of 1200 dpi binary image 50 where all black pixels are resident—thereby outputting a binary value of 16. If, however, window 40 logically overlays an area of bitmapped image 50 wherein 4 black pixels reside, a binary value of 4 results, causing the laser to be modulated so as to produce an optical output for 25% of a pixel time, assuming a linear conversion is employed (i.e., waveform 62). The modulated laser output is centered in the pixel time.

The result of outputting time-adjacent optical pulses 60 and 62 is to cause a charge depletion of an organic photoreceptor. The exposure waveforms appear at 64 and 66 in FIG. 4 and tend to combine to provide a continuous discharge waveform 67. The resultant OPC charge is shown by curve 68 which, after development, results in an expanded dot width, rather than two separate dots.

The result of this procedure is an edge-smoothing action which substantially reduces, if not eliminates, alias effects.

It is to be understood, that because of the non-linearities of the electrostatic printing process, the relationship between the count of window pixel black dots and the modulated laser output may not be linear. In fact, it is preferred that the relationship be non-linear, with the lower ⅔ (approximately) of the pixel counts causing the output of laser modulation pulse widths which are somewhat less in percentage than the ratio of each pixel count to the total pixel count value in the window.

It should be understood that the foregoing description is only illustrative of the invention. Various alternatives and modifications can be devised by those skilled in the art without departing from the invention. For instance, while specific resolution levels have been recited above, those skilled in the art will realize that the invention is applicable to edge smoothing at many levels of resolution. Further, while it is preferred that the modulation signals alter the duration of the laser beam outputs, the modulation signals could modify the respective intensities of the beam outputs. Accordingly, the present invention is intended to embrace all such alternatives, modifications and variances which fall within the scope of the appended claims.

What is claimed is:

1. A method for converting a font contour to a multi-bit gray level pixel image which exhibits a printer-level resolution and for causing a laser printer/copier to reproduce said multi-bit gray level pixel image, said method comprising the steps of:

a) deriving a high resolution level binary pixel bitmap of said font contour, said high resolution level greater than said printer-level resolution;

b) logically stepping an m×n pixel window across pixel groups of said high resolution level binary pixel bitmap of said font contour and, at each step of said window, determining a count of pixels of one binary kind that are present within said window;

c) converting each count of pixels to a corresponding modulation signal, said converting producing modulation signals that are a non-linear function of counts of said pixels; and d) controlling a laser in accordance with each modulation signal to produce modulated optical beams which are employed by said laser/printer to produce an edge smoothed gray level pixel image.

2. The method as recited in claim 1, wherein said deriving step a) converts each character of a scalable font to said high resolution level binary pixel bitmap and a step b1) occurs before step c), as follows:

b1) storing each said count for a character to enable a later occurring print/copy action to call upon all counts derived for said character to create a gray level character.

3. The method as recited in claim 1, wherein said deriving step a) converts each character of a scalable font to said high resolution level binary pixel bitmap and a step b1) occurs before step c), as follows:

b1) storing a multi-bit gray level value corresponding to each said count for a character to enable a later occurring print/copy action to call upon each said multi-bit gray level value derived for said character to create a gray level character representation.

4. The method as recited in claim 1, wherein said high resolution level is an integer factor times said printer/copier resolution level.

5. The method as recited in claim 1, wherein said m×n pixel window is stepped across m×n pixel groups of said binary pixel bitmap of said image, without overlap.

6. The method as recited in claim 1, wherein steps a) and b) are performed by software procedures.

7. The method as recited in claim 1, wherein said modulation signal controls a duration of each optical beam.

8. The method as recited in claim 1, wherein within a range of pixel counts that is less than a total pixel count in said window, said converting step produces a modulation signal that is less in percentage than a ratio of a pixel count in said window to a total pixel count of all pixels in said window.

9. The method as recited in claim 8, wherein said range of pixel counts encompasses approximately a lower ⅔ of pixel count values of pixels in said window.

* * * * *